(12) United States Patent
Shohrab et al.

(10) Patent No.: US 11,240,428 B1
(45) Date of Patent: Feb. 1, 2022

(54) ADJUSTING CAMERA SETTINGS BASED ON A DISPLAY OF AN INFORMATION HANDLING SYSTEM

(71) Applicant: Dell Products L.P., Round Rock, TX (US)

(72) Inventors: Sheikh Shohrab, Singapore (SG); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/152,904

(22) Filed: Jan. 20, 2021

(51) Int. Cl.
  *H04N 5/232* (2006.01)
  *H04N 7/18* (2006.01)

(52) U.S. Cl.
  CPC ..... *H04N 5/23229* (2013.01); *H04N 5/23222* (2013.01); *H04N 7/18* (2013.01)

(58) Field of Classification Search
  CPC .. H04N 5/23229; H04N 5/23222; H04N 7/18; H04N 17/002
  See application file for complete search history.

(56) References Cited

U.S. PATENT DOCUMENTS

| | | | | |
|---|---|---|---|---|
| 6,798,446 B2 * | 9/2004 | Maggi | ............... | H04N 17/002 348/187 |
| 8,773,540 B2 * | 7/2014 | Friend | ............... | H04N 17/04 348/190 |
| 2002/0154326 A1 * | 10/2002 | Tsuchiya | ............... | G06K 15/02 358/1.9 |

* cited by examiner

*Primary Examiner* — Nelson D. Hernández Hernández
(74) *Attorney, Agent, or Firm* — Baker Botts L.L.P.

(57) ABSTRACT

Adjusting camera settings based on a display, including identifying display settings of a display coupled to an information handling system, the display settings including a current color profile of the display; accessing a look-up table (LUT), the LUT identifying, for each color profile of a plurality of color profiles, camera settings parameters associated with a camera coupled to the information handling system; identifying, based on the LUT, one or more camera settings parameters associated with the current color profile of the display; applying the identified camera settings parameters to the camera settings at the camera; obtaining, from the camera, an image that is based on the applied camera settings that corresponds to the current color profile of the display; and providing the image for presentation at the display.

20 Claims, 3 Drawing Sheets

ADJUSTING CAMERA SETTINGS BASED ON A DISPLAY OF AN INFORMATION HANDLING SYSTEM

BACKGROUND

Field of the Disclosure

The disclosure relates generally to an information handling system, and in particular, adjusting camera settings based on a display of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

There can be multiple settings of a camera of an information handling system that can be set by a user using a camera utility application of the information handling system. However, these camera settings may not be optimized for the display that the user is using with the information handling system. This can result in sub-optimal image quality/visual experience, including over-saturated color, artificial skin tones, etc.

SUMMARY

Innovative aspects of the subject matter described in this specification may be embodied in a method of adjusting camera settings based on a display, the method including: identifying display settings of a display coupled to an information handling system, the display settings including a current color profile of the display; accessing a look-up table (LUT), the LUT identifying, for each color profile of a plurality of color profiles, camera settings parameters associated with a camera coupled to the information handling system; identifying, based on the LUT, one or more camera settings parameters associated with the current color profile of the display; applying the identified camera settings parameters to the camera settings at the camera; obtaining, from the camera, an image that is based on the applied camera settings that corresponds to the current color profile of the display; and providing the image for presentation at the display.

Other embodiments of these aspects include corresponding systems, apparatus, and computer programs, configured to perform the actions of the methods, encoded on computer storage devices.

These and other embodiments may each optionally include one or more of the following features. For instance, the camera settings associated with the camera include a resolution setting of the camera, a color setting of the camera, a brightness setting of the camera, a white point setting of the camera, and a color temperature setting of the camera. The display settings of the display further include a current blue light correction setting, the method further comprising: accessing the look-up table (LUT), the LUT further identifying, for each blue light correction setting of a plurality of blue light correction settings, additional settings parameters associated with the camera; identifying, based on the LUT, one or more additional settings parameters associated with the current blue light correction setting of the display; and applying the one or more identified additional settings parameters to the settings at the camera. Identifying the display settings of the display further comprises obtaining ambient light settings of an ambient light sensor (ALS) coupled to the display. The display settings of the display correspond to a hardware limitation of the display. The display settings of the display further include a current refresh rate setting, the method further comprising: accessing the look-up table (LUT), the LUT further identifying, for each refresh rate setting of a plurality of refresh rate settings, additional settings parameters associated with the camera; identifying, based on the LUT, one or more additional settings parameters associated with the current refresh rate setting of the display; and applying the one or more identified additional settings parameters to the settings at the camera. The camera is internally coupled to the information handling system. The camera is externally coupled to the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for adjusting camera settings based on a display of the information handling system. In short, a display management computing module can identify display settings of the display, including a color profile of the display, and update settings of a camera to align with the color profile of the display. The display management computing module can access a look-up table that stores settings for the camera that correspond to differing color profiles of the display. The display management computing module can apply the settings to the camera (obtained from the look-up table) based on the color profile of the display.

Specifically, this disclosure discusses a system and a method for adjusting camera settings based on a display, the method including identifying display settings of a display coupled to an information handling system, the display settings including a current color profile of the display; accessing a look-up table (LUT), the LUT identifying, for each color profile of a plurality of color profiles, settings parameters associated with a camera coupled to the information handling system; identifying, based on the LUT, one or more settings parameters associated with the current color profile of the display; applying the identified parameters to the settings at the camera; obtaining, from the camera, an image that is based on the adjusted settings that corresponds to the current color profile of the display; and providing the image for presentation at the display.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Figure 1:
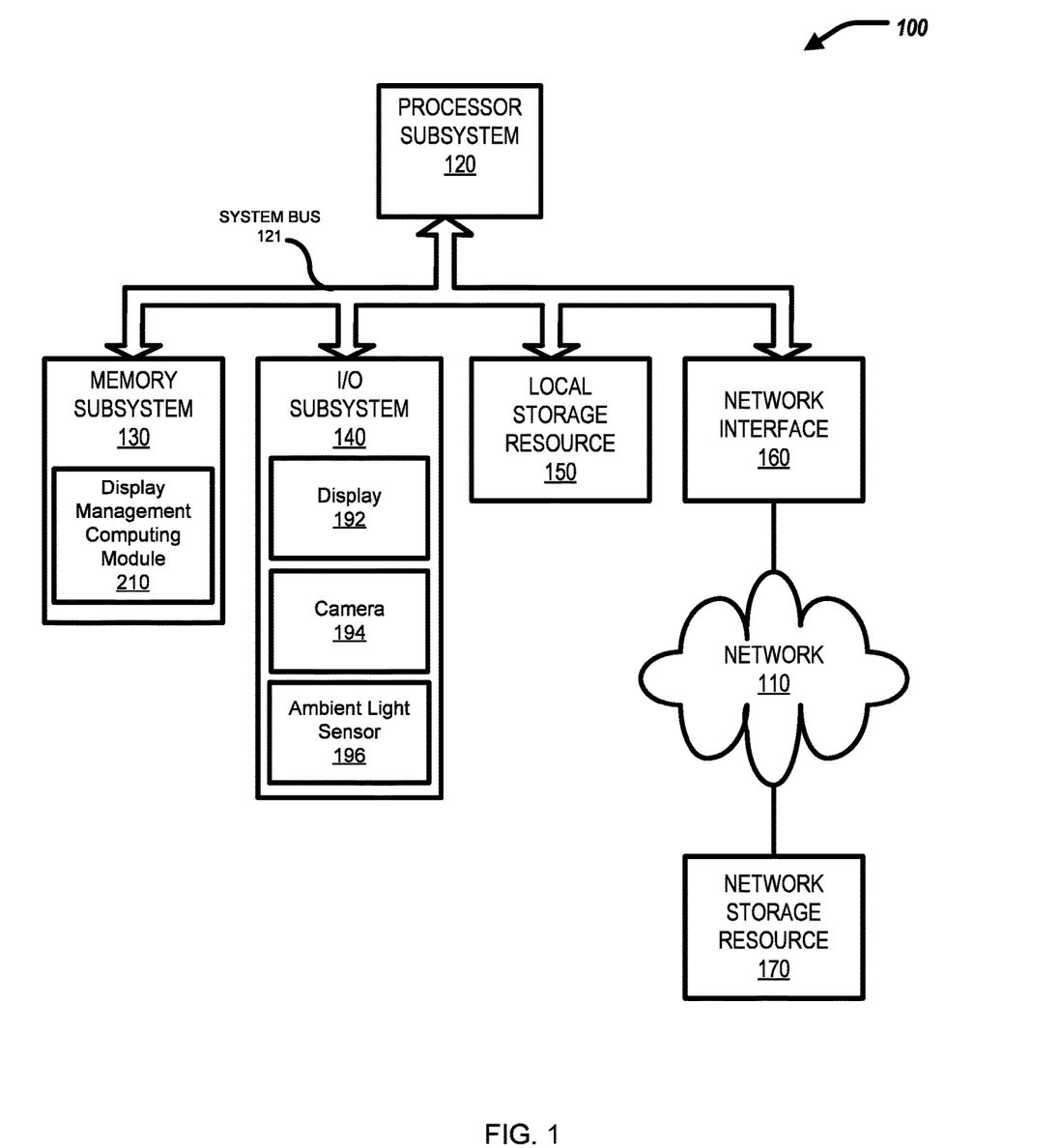
FIG. 1 is a block diagram of selected elements of an embodiment of an information handling system.
Figure 2:
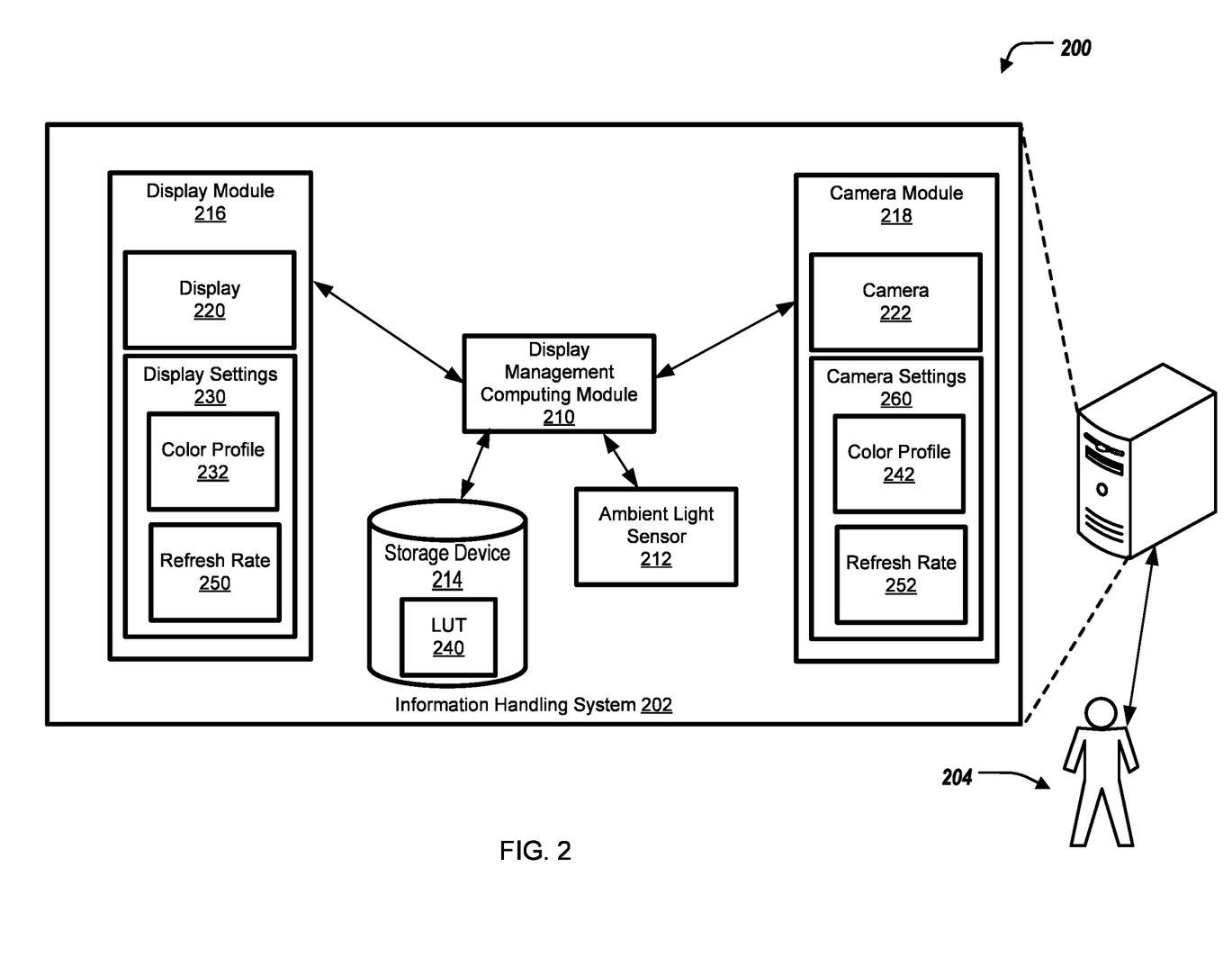
FIG. 2 illustrates a block diagram of an information handling system for adjusting camera settings based on a display of the information handling system.
Figure 3:
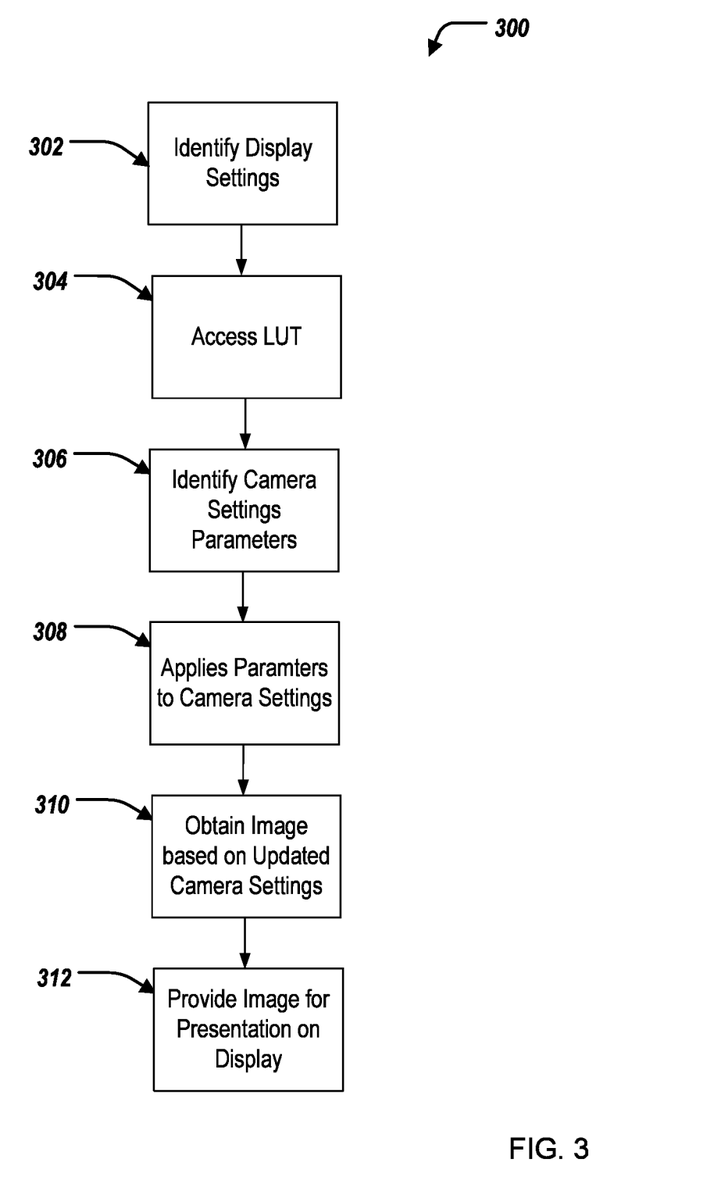
FIG. 3 illustrates a method for adjusting camera settings based on a display of the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. For example, the I/O subsystem 140 can include a display 192, a camera 194, and an ambient light sensor (ALS) 196.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a display management computing module 190. The display management computing module 190 can be included by the memory subsystem 130. The display management computing module 190 can include a computer-executable program (software). The display management computing module 190 can be executed by the processor subsystem 120.

In short, the display management computing module 190 can identify display settings of the display 192, including a color profile of the display 192, and update settings of the camera 194 to align with the color profile of the display 192. The display management computing module 190 can access a look-up table that stores settings for the camera 194 that correspond to differing color profiles of the display 192. The display management computing module 190 can apply the settings to the camera 194 (obtained from the look-up table) based on the color profile of the display 192.

Turning to FIG. 2, FIG. 2 illustrates an environment 200 including an information handling system 202 and a user 204. The information handling system 202 can include a display management computing module 210, an ambient light sensor (ALS) 212, a storage device 214, a display module 216, and a camera module 218. In some examples, the information handling system 202 is similar to, or includes, the information handling system 100 of FIG. 1. In some examples, the display management computing module 210 is similar to, or includes, the display management computing module 190 of FIG. 1. In some examples, the ALS 212 is similar to, or includes, the ALS 196 of FIG. 1.

The display module 216 can include a display 220. In some examples, the display 220 is similar to, or includes, the display 192 of FIG. 1. In some examples, the display 192 can include a high-definition graphics display resolution (such as 1080p or 4K).

The camera module 218 can include a camera 222. In some examples, the camera 222 is similar to, or includes, the camera 194 of FIG. 1. In some examples, the camera 222 is internally coupled to the information handling system 202. In some examples, the camera 222 is externally coupled to the information handling system. In some examples, the camera 222 can include a high-definition resolution (such as 1080p or 4K).

The storage device 214 can provide storage of, and/or access to, a look-up table (LUT) 240.

The display management computing module 190 can be in communication with the ALS 212, the storage device 214, the display module 216, and the camera module 218. In some examples, the camera module 218 can ultimately be in communication with the display module 216 through a USB and video connection, or a USB-C connection.

In some implementations, the display management computing module 210 can identify display settings 230 of the display 220. For example, the display settings 230 can include a color profile 232 (or color space 232) of the display 220. The color profile 232 (or color space 232) can include a specific organization of colors that are displayed by the display 220; or color capabilities of the display 220. For example, the color profile 232 can include sRGB (standard red green blue) color profile (or color space), Adobe RGB (red green blue) color profile (or color space), or DCI-P3 color profile (or color space).

In some examples, the display settings 230 can further include a resolution setting, a color setting, a brightness setting, a white point setting, and a color temperature. In some examples, the display settings 230 can further include a white balance setting, a tone mapping setting, and a gamma correction setting.

In some examples, the display settings 230 corresponds to a hardware limitation of the display 220. That is, the display settings 230 are limited by the capabilities of the display 220. For example, the values of the resolution setting, the color setting, the brightness setting, the white point setting, the color temperature, white balance setting, the tone mapping setting, and the gamma correction setting can be limited by the hardware capabilities of the display 220.

In some examples, the display settings 230 are in response to user input from the user 204. For example, depending on a computer-implemented application currently executing on the information handling system 202, the user 204 can provide user input of the display settings 230 (the user 204 "setting" the display settings 230 of the display 220 based on the currently executing computer-implemented application).

In some examples, the display management computing module 210 can identify the display settings 230 of the display 220 by obtaining ambient light settings of the ALS 212.

In some implementations, the display management computing module 210 can access the LUT 240. The LUT 240 can identify, for each color profile of a plurality of color profiles, settings parameters of the camera 222. Specifically, the LUT 240 can store, for a plurality of color profiles such as DCI-P3 and Adobe RGB, a corresponding predetermined array of settings parameters of the camera 222 for the color profile. In short, the LUT 240 can transform color input values of the display 220 to settings parameters of the camera 222 that correspond, or match, to the color profile 232 of the display 220. In some examples, the LUT 240 is predefined/predetermined during manufacture of the display 220 and/or information handling system 202. That is, the LUT 240 can be predefined/predetermined based on the hardware capabilities of the display 220. In some examples, the user 204 can modify or update the LUT 240. For example, for color-critical applications displayed by the display 220, the user 204 can modify the LUT 240 appropriately. For example, the hardware capabilities of the display 220 can degrade over time (e.g., backlight capabilities of the display 220), and the user 204 can modify the LUT 240 appropriately.

In some implementations, the display management computing module 210 can identify, based on the LUT 240, one or more setting parameters associated with the current color profile 232 of the display 220. For example, based on the display settings 230 of the display 220, and in particular, the color profile 232 of the display 220, the display management computing module 210 can identify setting parameters for the color profile 232. The settings parameters can include values for camera settings 260 of the camera 222. The camera settings 260 can include a color profile 242 (or color space 242) of the camera 222. The color profile 242 (or color space 242) can include a specific organization of colors that are able to be captured by the camera 222; or color capabilities of the camera 222. For example, the color profile 242 can include sRGB (standard red green blue) color profile (or color space), Adobe RGB (red green blue) color profile (or color space), or DCI-P3 color profile (or color space). In some examples, the camera settings 260 can further include a resolution setting, a color setting, a brightness setting, a white point setting, and a color temperature. In some examples, the camera settings 260 can further include a white balance setting, a tone mapping setting, and a gamma correction setting.

In some implementations, the display management computing module 210 can apply the identified parameters to the camera settings 260. That is, the display management computing module 210 can update the camera settings 260 based on the identified parameters from the LUT 240 that correspond to the current display settings 230, and specifically, the color profile 232, of the display 220. In short, the display management computing module 210 updates the camera settings 260 with the values identified from the LUT 240 for the specific color profile 232 of the display 220. In some examples, the display management computing module 210 can update such camera settings 260 as the resolution setting, the color setting, the brightness setting, the white point setting, the color temperature, the white balance setting, the tone mapping setting, and the gamma correction setting of the camera 222.

In some implementations, the display management computing module 210 can obtain, from the camera 222, an image that is based on the adjusted camera settings 260 that correspond to the current color profile 232 of the display 220. That is, the camera 222, with the adjusted settings 260 that are based on the identified parameters from the LUT 240 that correspond to the current display settings 230, and specifically, the color profile 232, of the display 220, can capture an image and provide such image to the display management computing module 210.

In some implementations, the display management computing module 210 can provide the image for presentation on the display 220. That is, the image can be displayed by the display 220 and based on the identified parameters from the LUT 240 that correspond to the current display settings 230, and specifically, the color profile 232, of the display 220.

In some examples, the display settings 230 of the display 220 can further include a refresh rate 250. The display management computing module 210 can access the LUT 240, with the LUT 240 identifying, for each refresh rate of a plurality of refresh rates, additional settings parameters of the camera 222. Specifically, the LUT 240 can store, for a plurality of refresh rates (60 Hz, 75 Hz, etc.), a corresponding predetermined array of settings parameters of the camera 222 for the refresh rate. The display management computing module 210 can identify, based on the LUT 240, one or more additional setting parameters associated with the current refresh rate 250 of the display 220. For example, based on the display settings 230 of the display 220, and in particular, the refresh rate 250 of the display 220, the display management computing module 210 can identify additional setting parameters for the refresh rate 250 of the display 220. The additional settings parameters can include values for the camera settings 260 of the camera 222. The display management computing module 210 can apply the identified additional parameters to the camera settings 260. That is, the display management computing module 210 can update the camera settings 260 based on the identified additional parameters from the LUT 240 that correspond to the current display settings 230, and specifically, the refresh rate 250, of the display 220. In short, the display management computing module 210 updates the camera settings 260 with the values identified from the LUT 240 for the specific refresh rate 250 of the display 220. In some examples, the display management computing module 210 can update camera settings 260 such as the refresh rate 252 of the camera 222. For example, when the refresh rate 250 of the display is 60 Hertz, the refresh rate 252 of the camera 222 can be adjusted to 60 Hertz.

In some examples, the display settings 230 of the display 220 can further include a blue light correction setting. The display management computing module 210 can access the LUT 240, with the LUT 240 identifying, for each blue light correction setting of a plurality of blue light correction settings, additional settings parameters of the camera 222. Specifically, the LUT 240 can store, for a plurality of blue light levels, a corresponding predetermined array of settings parameters of the camera 222 for the blue light level. The display management computing module 210 can identify, based on the LUT 240, one or more additional setting parameters associated with the current blue light level of the display 220. For example, based on the display settings 230 of the display 220, and in particular, the blue light level of the display 220, the display management computing module 210 can identify additional setting parameters for the blue light level. The additional settings parameters can include values for the camera settings 260 of the camera 222. The display management computing module 210 can apply the identified additional parameters to the camera settings 260. That is, the display management computing module 210 can update the camera settings 260 based on the identified additional parameters from the LUT 240 that correspond to the current display settings 230, and specifically, the blue light levels, of the display 220. In short, the display management computing module 210 updates the camera settings 260 with the values identified from the LUT 240 for the specific blue light level of the display 220. For example, the camera settings 260 can be adjusted for the blue light level at the display 220 based on a current day and time.

FIG. 3 illustrates a flowchart depicting selected elements of an embodiment of a method 300 for adjusting camera settings 260 based on a display of the information handling system. The method 300 may be performed by the information handling system 100, the information handling system 202, and/or the display management computing module 210, and with reference to FIGS. 1-2. It is noted that certain operations described in method 300 may be optional or may be rearranged in different embodiments.

The display management computing module 210 identifies the display settings 230 of the display 220, at 302. The display settings 230 including a current color profile 232 of the display 220. The display management computing module 210 accesses the LUT 240, at 304. The LUT 240 identifies, for each color profile of a plurality of color profiles, settings parameters associated with the camera 222. The display management computing module 210 identifies, based on the LUT 240, one or more settings parameters associated with the current color profile 232 of the display 220, at 306. The display management computing module 210 applies the identified parameters to the camera settings 260, at 308. The display management computing module 210 obtains, from the camera 222, an image that is based on the adjusted settings 240 that corresponds to the current color profile 232 of the display 220, at 310. The display management computing module 210 provides the image for presentation at the display 220, at 312.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of adjusting camera settings based on a display, the method comprising:
   identifying display settings of a display coupled to an information handling system, the display settings including a current color profile of the display;
   accessing a look-up table (LUT), the LUT identifying, for each color profile of a plurality of color profiles, camera settings parameters associated with a camera coupled to the information handling system;
   identifying, based on the LUT, one or more camera settings parameters associated with the current color profile of the display;
   applying the identified camera settings parameters to the camera settings at the camera;
   obtaining, from the camera, an image that is based on the applied camera settings that corresponds to the current color profile of the display; and
   providing the image for presentation at the display.

2. The computer-implemented method of claim 1, wherein the camera settings associated with the camera include a resolution setting of the camera, a color setting of the camera, a brightness setting of the camera, a white point setting of the camera, and a color temperature setting of the camera.

3. The computer-implemented method of claim 1, wherein the display settings of the display further include a current blue light correction setting, the method further comprising:
   accessing the look-up table (LUT), the LUT further identifying, for each blue light correction setting of a plurality of blue light correction settings, additional settings parameters associated with the camera;
   identifying, based on the LUT, one or more additional settings parameters associated with the current blue light correction setting of the display; and applying the one or more identified additional settings parameters to the settings at the camera.

4. The computer-implemented method of claim 1, wherein identifying the display settings of the display further comprises obtaining ambient light settings of an ambient light sensor (ALS) coupled to the display.

5. The computer-implemented method of claim 1, wherein the display settings of the display correspond to a hardware limitation of the display.

6. The computer-implemented method of claim 1, wherein the display settings of the display further include a current refresh rate setting, the method further comprising:
  accessing the look-up table (LUT), the LUT further identifying, for each refresh rate setting of a plurality of refresh rate settings, additional settings parameters associated with the camera;
  identifying, based on the LUT, one or more additional settings parameters associated with the current refresh rate setting of the display; and
  applying the one or more identified additional settings parameters to the settings at the camera.

7. The computer-implemented method of claim 1, wherein the camera is internally coupled to the information handling system.

8. The computer-implemented method of claim 1, wherein the camera is externally coupled to the information handling system.

9. An information handling system comprising a processor having access to memory media storing instructions executable by the processor to perform operations comprising:
  identifying display settings of a display coupled to an information handling system, the display settings including a current color profile of the display;
  accessing a look-up table (LUT), the LUT identifying, for each color profile of a plurality of color profiles, camera settings parameters associated with a camera coupled to the information handling system;
  identifying, based on the LUT, one or more camera settings parameters associated with the current color profile of the display;
  applying the identified camera settings parameters to the camera settings at the camera;
  obtaining, from the camera, an image that is based on the applied camera settings that corresponds to the current color profile of the display; and
  providing the image for presentation at the display.

10. The information handling system of claim 9, wherein the camera settings associated with the camera include a resolution setting of the camera, a color setting of the camera, a brightness setting of the camera, a white point setting of the camera, and a color temperature setting of the camera.

11. The information handling system of claim 9, wherein the display settings of the display further include a current blue light correction setting, the operations further comprising:
  accessing the look-up table (LUT), the LUT further identifying, for each blue light correction setting of a plurality of blue light correction settings, additional settings parameters associated with the camera;
  identifying, based on the LUT, one or more additional settings parameters associated with the current blue light correction setting of the display; and
  applying the one or more identified additional settings parameters to the settings at the camera.

12. The information handling system of claim 9, wherein identifying the display settings of the display further comprises obtaining ambient light settings of an ambient light sensor (ALS) coupled to the display.

13. The information handling system of claim 9, wherein the display settings of the display correspond to a hardware limitation of the display.

14. The information handling system of claim 9, wherein the display settings of the display further include a current refresh rate setting, the operations further comprising:
  accessing the look-up table (LUT), the LUT further identifying, for each refresh rate setting of a plurality of refresh rate settings, additional settings parameters associated with the camera;
  identifying, based on the LUT, one or more additional settings parameters associated with the current refresh rate setting of the display; and
  applying the one or more identified additional settings parameters to the settings at the camera.

15. The information handling system of claim 9, wherein the camera is internally coupled to the information handling system.

16. The information handling system of claim 9, wherein the camera is externally coupled to the information handling system.

17. A non-transitory computer-readable medium storing software comprising instructions executable by one or more computers which, upon such execution, cause the one or more computers to perform operations comprising:
  identifying display settings of a display coupled to an information handling system, the display settings including a current color profile of the display;
  accessing a look-up table (LUT), the LUT identifying, for each color profile of a plurality of color profiles, camera settings parameters associated with a camera coupled to the information handling system;
  identifying, based on the LUT, one or more camera settings parameters associated with the current color profile of the display;
  applying the identified camera settings parameters to the camera settings at the camera;
  obtaining, from the camera, an image that is based on the applied camera settings that corresponds to the current color profile of the display; and
  providing the image for presentation at the display.

18. The non-transitory computer-readable medium of claim 17, wherein the camera settings associated with the camera include a resolution setting of the camera, a color setting of the camera, a brightness setting of the camera, a white point setting of the camera, and a color temperature setting of the camera.

19. The non-transitory computer-readable medium of claim 17, wherein the display settings of the display further include a current blue light correction setting, the operations further comprising:
  accessing the look-up table (LUT), the LUT further identifying, for each blue light correction setting of a plurality of blue light correction settings, additional settings parameters associated with the camera;
  identifying, based on the LUT, one or more additional settings parameters associated with the current blue light correction setting of the display; and
  applying the one or more identified additional settings parameters to the settings at the camera.

20. The non-transitory computer-readable medium of claim 17, wherein identifying the display settings of the display further comprises obtaining ambient light settings of an ambient light sensor (ALS) coupled to the display.

* * * * *